Jan. 23, 1973 E. FARIELLO 3,712,959

METHOD AND APPARATUS FOR DETECTING SPEECH SIGNALS IN THE PRESENCE OF NOISE

Filed March 13, 1970 4 Sheets-Sheet 1

CUMULATIVE DISTRIBUTION FUNCTION OF VOICE AND NOISE

INVENTOR
ETTORE FARIELLO
BY Sughrue, Rothwell, Mion, Zinn & Macpeak
ATTORNEYS

Jan. 23, 1973 E. FARIELLO 3,712,959

METHOD AND APPARATUS FOR DETECTING SPEECH SIGNALS IN THE PRESENCE OF NOISE

Filed March 13, 1970 4 Sheets-Sheet 2

INVENTOR
ETTORE FARIELLO

BY Sughrue, Rothwell, Mion, Zinn & Macpeak
ATTORNEYS

INVENTOR
ETTORE FARIELLO

BY Sughrue, Rothwell, Mion, Zinn & Macpeak
ATTORNEYS

INVENTOR
ETTORE FARIELLO
BY Sughrue, Rothwell, Mion,
Zinn & Macpeak
ATTORNEYS

United States Patent Office 3,712,959

Patented Jan. 23, 1973

3,712,959

METHOD AND APPARATUS FOR DETECTING SPEECH SIGNALS IN THE PRESENCE OF NOISE

Ettore Fariello, Gaithersburg, Md., assignor to Communications Satellite Corporation, Washington, D.C.

Continuation-in-part of application Ser. No. 841,528, July 14, 1969. This application Mar. 13, 1970, Ser. No. 19,184

Int. Cl. H04b *15/00*

U.S. Cl. 179—1 VC 3 Claims

ABSTRACT OF THE DISCLOSURE

A method and apparatus for detecting the instantaneous peak values of a PCM coded voice signal above a threshold level and energizing a transmitter carrier in response thereto, thereby conserving carrier power during the periods when no voice signal is present. The threshold is established at a level where the probability of the instantaneous value of a speech signal exceeding its RMS value is much greater than the probability of the instantaneous value of a white Gaussian noise signal exceeding its RMS value for equal values of power. The circuit maintains carrier power for a variable delay or deferred hangover period after each thresholded voice detection. The hangove period varies from a predetermined minimum time delay to a maximum time delay which equals the length of the voice burst not exceeding 150 milliseconds. Alternately, because of the particular characteristics of speech waveforms, the thresholded voice detections may be conveniently counted and the carrier transmitter energized whenever the count exceeds a predetermined value, which further reduces the margin of noise triggering error. In addition, the deferred, variable hangover period may be replaced by a fixed delay to futher simplify the circuitry required.

This application is a continuation-in-part of application Ser. No. 841,528, filed July 14, 1969, now abandoned.

BACKGROUND OF THE INVENTION

(1) Field of the invention

This invention relates to a method and apparatus for digital speech detection in a Pulse Code Modulation communications system.

(2) Description of the prior art

It has long been recognized that during conversation, speech signals are present only during thirty to forty percent of the time. The remaining time is occupied by pauses or tones too faint to be intelligible, etc. Advantage can be taken of this fact to improve communications system efficiency be energizing a transmitter, in response to a speech detector output, only during those periods when meaningful speech signals are present, thereby effecting a significant power savings. This technique is particularly advantageous in satellite communications systems since power consumption is one of the controlling factors in determining the number of voice channels that may be employed.

Most prior art speech detectors are analog rather than digital in nature and measure the RMS rather than the instantaneous value of the input signal. A threshold level is chosen and when the RMS value of the input signal exceeds the threshold, an output signal is produced to indicate the presence of speech. Speech detectors of this type suffer from two major disadvantages. First, they require a relatively long delay after the commencement of a speech signal before an output is produced. This is due to the fact that such detectors involve an integral or storage function and it takes a certain amount of time for the RMS value of the signal to build up to a level above the threshold. This results in clipping off the initial portions of sounds, and giving them a sharp quality, which introduces undesired distortion in communications systems triggered by the speech detector output.

Second, the detection threshold of the prior art speech detectors must be set at a considerably low level in order to properly respond to all of the meaningful intelligence in the speech signal and to maintain good speech quality. As a result of the low threshold level, extraneous noise signals often trigger the detectors, which introduces further distortion into the system and cancels out some of the desired power savings.

SUMMARY OF THE INVENTION

This invention provides a digital speech detector which responds to the instantaneous peak, rather than RMS, values of a coded voice signal. Such peaks occur much sooner after the commencement of speech than the time required for the RMS value to build up to a useful threshold level. It is based on the principle that above a certain level, the probability of the instantaneous value of a voice signal exceeding its RMS value is increasingly greater than the probability of the instantaneous value of a random or white Gaussian noise signal exceeding its RMS value. Stated another way, for equal RMS powers of voice and white Gaussian noise signals, instantaneous peak voltages above a certain level will occur more often for voice than for noise. By providing a speech detector which senses instantaneous signal levels and compares them to a threshold triggering level established in this favorable probability region, greatly improved performance can be realized as compared with the prior art devices, both in terms of detection delay and noise rejection.

Vowels, semi-vowels and voiced fricative consonants are bursts of an nearly periodic waveform whose peaks occur in groups. Within these groups, the peaks are nearly uniformly spaced in time. Each group contains a certain number of peaks whose amplitudes decrease in a continuous way until the end of each pitch period or stay fairly constant, depending on the power of the voice and on the type of talker. Furthermore, the peaks belonging to each group are spaced according to the spectral distribution of the speech being uttered. For this reason, and because the PCM sampling rate is at or above the Nyquist limit, the digital speech detector is triggered each time by more than one consecutive sample.

Stop consonants are not grouped as for the first case. Instead, their peaks have a time interval distribution with a fairly exponential law. However, each peak lasts several ms. and the sampling system will provide more than one sample for each one of the peaks.

Advantage may be taken of this fact by requiring that in several consecutive samples be above the threshold before the decision is made that speech is present.

The noise, as any completely random phenomenon, does ot have these characteristics. Higher peaks are usually followed by very low peaks.

In a specific embodiment of the invention, an incoming PCM voice signal is fed to a digital comparator where each digitally coded amplitude sample is compared with a digitally coded word corresponding to the selected threshold level. Whenever one of the voice signal samples equals or exceeds the threshold level, an output is raised which triggers a pulse generator. The latter, in turn, produces an output pulse having a minimum duration chosen to provide a sufficient delay so that the detector will not generate a final output signal for each separate resonance peak or instantaneous value of a speech signal above the threshold. That is, the final output will remain present for the entire duration of at least each continuous letter or sound, as discussed in the preceding paragraph.

The pulse generator output is suppled to a deferred hangover time counter whose output controls the setting and resetting of a carrier control flip-flop. A raised output from the flip-flop energizes or enables the carrier signal in the transmitter of the communications system in which the speech detector is incorporated, thus effecting the final result of conserving carrier power in the absence of an intelligence conveying speed signal. The deferred hangover time counter maintains a raised output on the carrier control flip-flop after the cessation of a speech burst for a period of time equal to the duration of the burst but not exceeding a fixed maximum. The purpose of this delay is to prevent switching the transmitter carrier on and off between each speech syllable or momentary sound break, thus preventing excessive switching transients and ensuring smooth transmission flow.

In an alternate embodiment, the thresholded voice detection outputs from the digital comparator are fed to a decision pulse counter which produces an output whenever four consecutive pulses are supplied to it, indicating that a voice signal is present for four consecutive sampling periods. The counter output is applied to the pulse generator whose output in turn is fed directly to the carrier control flip-flop. The four consecutive count requirement further reduces the likelihood of noise triggering due to its random characteristic according to which higher peaks are usually followed by very low peaks. Therefore, the probability of having four consecutive high peaks is negligible. The elimination of the deferred hangover time counter further simplifies the circuitry requirements.

BRIEF DESCRIPTION OF THE DRAWINGS

The foregoing and other objects, features and advantages of the invention will be apparent from the following more particular description of two specific embodiments of the invention, as illustrated in the accompanying drawings, in which.

DESCRIPTION OF THE PREFERRED EMBODIMENT

Figure 1:
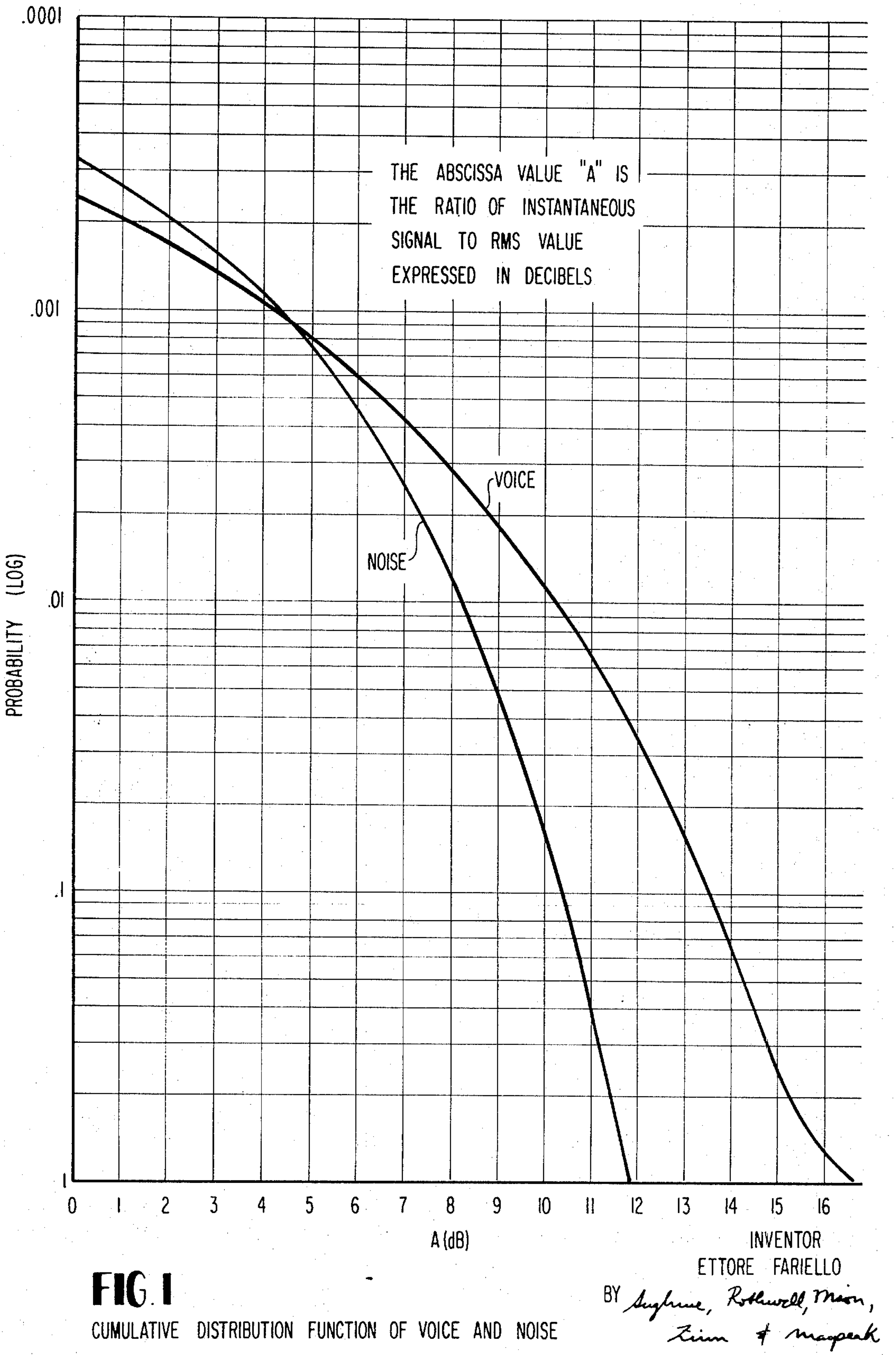
FIG. 1 shows a plot of cumulative distribution functions for both voice and random noise signals.

Referring now to the drawings, FIG. 1 shows a cumulative distribution function plot of both voice and white Gaussian noise wherein the abscissa values are ratios of instantaneous to RMS signal levels expressed in db and the ordinate values are probabilities plotted on a logarithmic scale. From this, it can easily be seen that above approximately 4.5 db, the probability of the voice signal ratio becomes increasingly greater than that of the noise signal ratio. Therefore, by establishing a sufficiently high detector threshold level in the favorable probability region, the chances of triggering due to an instantaneous noise signal can be minimized or even eliminated. For example, using a threshold level of −25 db mo., in contrast to the −40 db. mo. level commonly used in the prior art analog or RMS storage type detectors, the speech detector of this invention will not trigger on noise signals having RMS powers of −35 db but will trigger on voice signals of −45 db.

Figure 2:
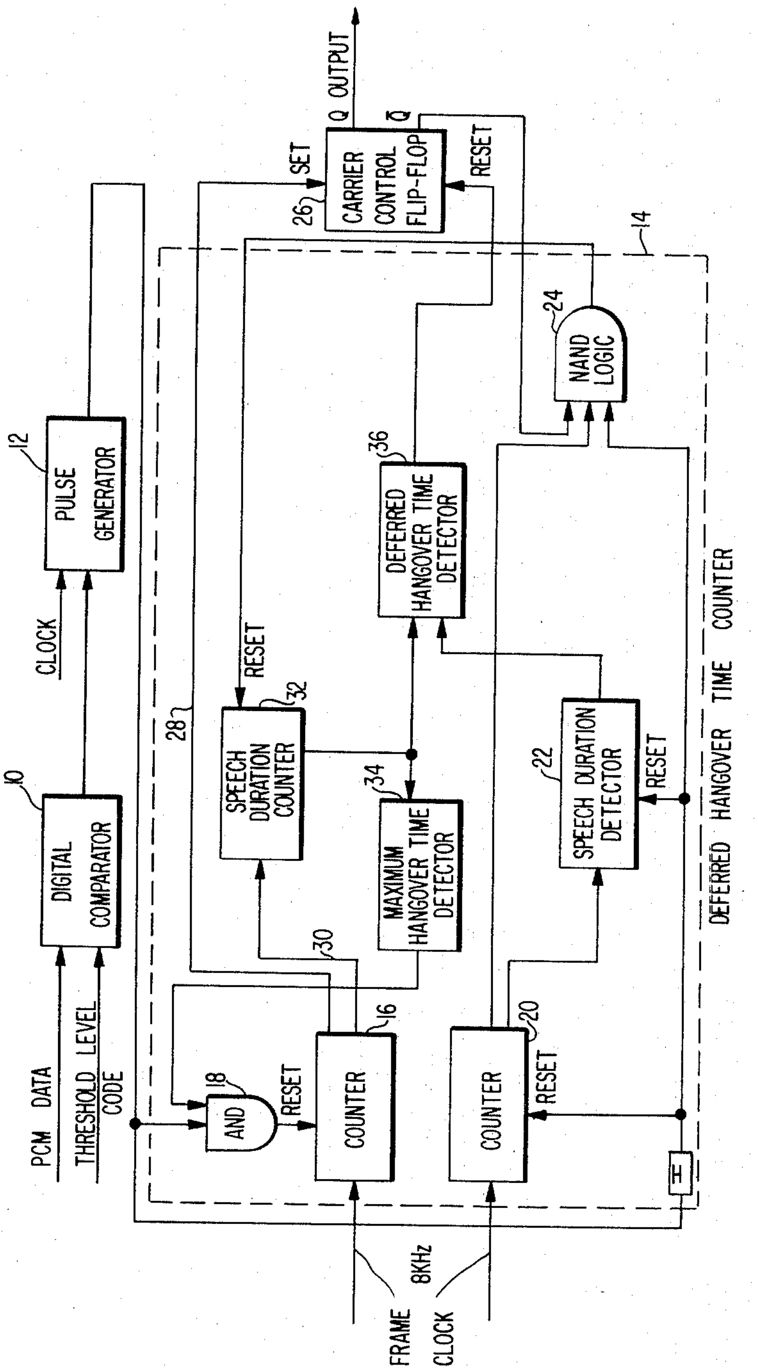
FIG. 2 shows a block circuit diagram of a digital speech detector constructed in accordance with the teachings of this invention.

In the block diagram of FIG. 2, the selected threshold level code is fed to a digital comparator 10. The threshold level code, for example, may be the last 6 bits of a 7-bit code word in a PCM code having 128 amplitude sampling levels. The neutral point or zero voltage level lies between the 63rd and 64th levels and the code words for levels an equal distance above and below the zero level differ only by their first or sign bits. Thus, the threshold level code of 011000 would correspond to the 24th and 103rd levels, whose respective code words are 0011000 and 1011000. The threshold level code may be repetitively clocked into the comparator 10 in serial or parallel fashion, or it may be permanently stored in the comparator.

The second comparator input is the PCM code word for each amplitude sample, and this is taken from the output of a PCM coder. The comparator 10 produces an output pulse whenever the last 6 bits of a coded amplitude sample equal or exceed the selected threshold level code. This pulse actuates a pulse generator 12 which in turn produces an output pulse having a predetermined minimum duration sufficient to maintain the final detector output raised during continuous speech sounds, rather than producing a separate triggering for each instantaneous peak over the threshold. The minimum duration of the output pulse from pulse generator 12 is selected in accordance with the frequency of speech signal peaks, and is always greater than the PCM sampling rate. Pulse generator 12 is triggered by each output pulse from the comparator 10 and starts the delay with each triggering, so that if comparator 10 produces a series of pulses separated by less than the minimum output pulse duration of pulse generator 12, the output pulse of the latter remains raised. Pulse generator 12 may be implemented by any one of a number of known circuits, such as a series of cascaded, set override, flip-flops reset clocked by a pulse train derived from the system frame clock. The output of pulse generator 12 is represented by waveform A in the timing diagram of FIG. 3.

The output pulse of pulse generator 12 is supplied to a deferred hangover time counter 14 where it (1) enables counter 16 through AND gate 18, (2) resets counter 20, (3) resets speed duration detector 22, and (4) disables NAND logic 24. With its down reset signal removed, binary coded decimal counter 16 begins counting the 8 kHz. clock signal applied to its input. The first output pulse from the second stage of counter 16 sets the carrier control flip-flop 26 over lines 28, and the raised Q output from the flip-flop, as shown by waveform F in FIG. 3, enables the communications system carrier signal to initiate transmission. The second stage output of counter 16 is employed to trigger the carrier control flip-flop 26 in order to avoid a race condition in the system. This introduces a turn-on delay of 250 μsecs., but this is negligible as far as speech signal distortion is concerned.

Figure 3:
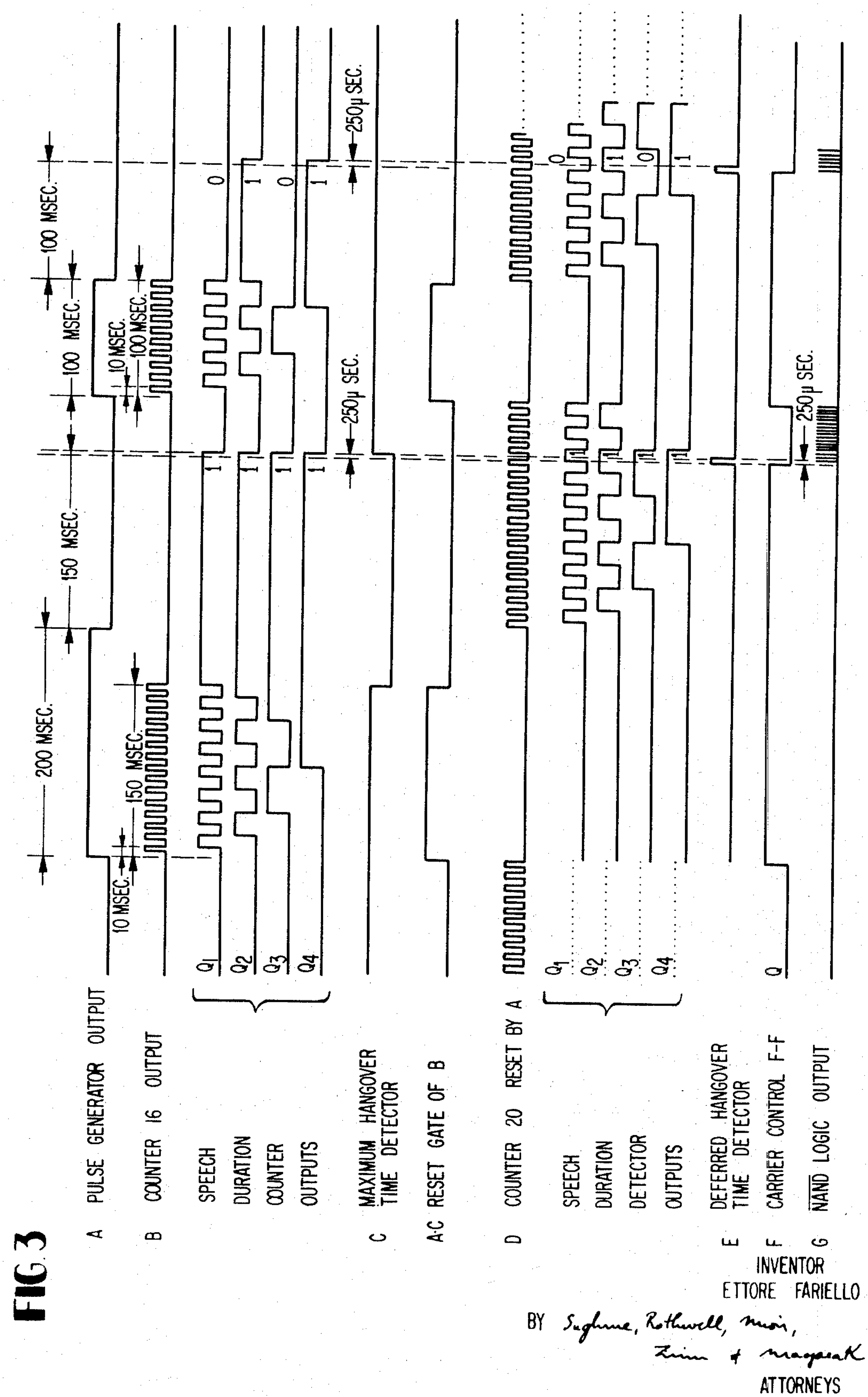
FIG. 3 shows a timing diagram for the circuit of FIG. 2.

Counter 16 produces output pulses on line 30 at 10 msec. intervals, as shown by waveform B in FIG. 3, and these are supplied to the speech duration counter 32. The latter is a binary counter composed of 4 flip-flops whose parallel outputs, as shown just below waveform B in FIG.

3, represent the number of pulses it has received from counter 16. If the speech duration counter 32 receives 15 pulses from counter 16 and reaches a maximum count of 1111, corresponding to raised signal levels on all four of its outputs, as shown in the first example in FIG. 3, the maximum hangover time detector 34, which decodes the contents of counter 32, lowers its output, as shown by wavefrom C in FIG. 3. This re-establishes the lowered reset level at the output of AND Gate 18, as shown by waveform A·C in FIG. 3, which resets counter 16, which resets counter 16 and leaves the 1111 output of speech duration counter 32 intact.

After the speech burst terminates and the delay provided by pulse generator 12 has expired, all of which takes 200 msec. in the first example in FIG. 3, the output from pulse generator 12 drops. This removes the raised reset level from binary coded decimal counter 20 and permits it to begin counting the 8 kHz. frame clock pulses, as shown by waveform D in FIG. 3. At the same time, the raised reset level is removed from speech duration detector 22 which now begins to count the output pulses from counter 20, as shown just below waveform D in FIG. 3. The speech duration detector 22 is a four-stage binary counter like the speech duration counter 32, except that it is in a reset condition while speech is present and is operating the rest of the time.

The parallel outputs from the speech duration counter 32 and the speech duration detector 22 are both fed to the deferred hangover time detector 36, which functions as a digital comparator by monitoring both sets of inputs and producing an output when coincidence is detected, as shown by waveform E in FIG. 3. The output from the deferred hangover time detector 36 resets carrier control flip-flop 26 whose lowered Q output disables the communications carrier signal to terminate transmission. The raised $\overline{Q}$ output from the reset carrier control flip-flop 26 is applied to NAND logic 24 which produces a raised reset signal, as shown by waveform G in FIG. 3, when the next pulse from counter 20 terminates. This reset signal is applied to speech duration counter 32 to reset it to the 0000 state, which in turn raises the output of the maximum hangover time detector 34 and lowers the output of the deferred hangover time detector 36. At this point, the circuit has completed a full speed detection cycle and is prepared to receive the next speech burst.

In the first example shown in FIG. 3, the speech burst, as represented by the output from pulse generator 12, lasts for 200 msec., which exceeds the 150 msec. maximum hangover delay provided by the circuit. Under these conditions, the maximum 15 pulse count of 1111 is reached in the speech duration counter 32. After the speech burst terminates, the speech duration detector 22 therefore counts up to a full count of 1111 before its output coincides with that of the speech duration counter 32 to trigger the deferred hangover time detector 36 and terminate the cycle. In this manner, the maximum hangover time delay of 150 msec. is provided.

In the second example shown in FIG. 3, the speech burst terminates after 100 msec. During this time, counter 16 supplies 10 pulses to the speech duration counter 32 whose binary output is therefore 1010. After the speech burst ends and enabled counter 20 supplies 10 pulses to the speech duration detector 22, the binary state of the latter is also 1010. The deferred hangover time detector 36 then senses this coincidence and resets the carrier control flip-flop 26 to terminate transmission. In this example, the circuit thus provides a hangover time delay equal to the duration of the speech burst since the burst does not exceed the 150 msec. maximum.

The details of the various circuit components, such as the counters 16 and 20, the speech duration counter 32 and detector 22, etc. have not been described herein since they may be implemented in a number of ways well known in the art. Similarly, NAND logic block 24 need not be a single gate but may comprise any one of a number of known logic configurations available to the designer.

Figure 4:
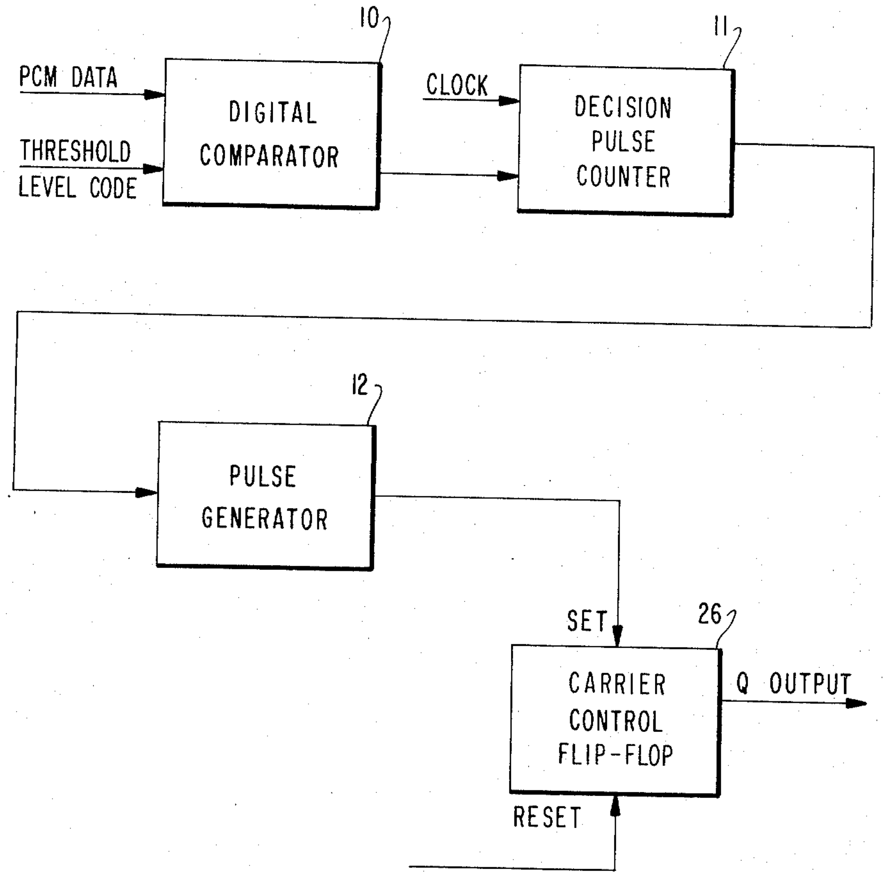
FIG. 4 shows a block circuit diagram of an alternate embodiment of the invention.

In the alternate embodiment shown in FIG. 4 the output from the comparator 10 is fed to a decision pulse counter 11. This counter produces an output only after a predetermined number of uninterrupted, consecutive pulses have been received from the comparator 10. Because of the particular characteristics of speech waveforms, as described earlier, and because noise signals are random in nature, this further enhances the reliability of the circuit by reducing the likelihood of noise triggering. If the decision pulse counter 11 is set to trigger on a count of four, which has been experimentally determined to be an optimum value, there is no discernable loss of speech intelligence due to start up clipping.

The output from counter 11 is fed to the pulse generator 12 whose output is directly coupled to the set input of the carrier control flip-flop 26. Alternateiy, the pulse generator output may itself be employed as the carrier enabling signal. A fixed hangover delay, optimally from 160–200 msecs., may be provided by the pulse generator 12, which precludes repetitive carrier triggering while greatly simplifying the circuitry requirements.

While the invention has been particularly shown and described with reference to two specific embodiments thereof, it will be understood by those skilled in the art that various changes in form and details may be made therein without departing from the spirit and scope of the invention.

What is claimed is:

1. In a method for detecting a speech signal in the presence of noise, including the ordered steps of:

(a) establishing an amplitude threshold at a level where the probability of the instantaneous value of a speech signal exceeding its RMS value is greater than the probability of the instantaneous value of a noise signal exceeding its RMS value.

(b) comparing instantaneous amplitude samples of an input signal with the threshold level, and (c) generating a signal to indicate the presence of speech whenever an amplitude sample exceeds the threshold level, and wherein the threshold level is represented by a digital code word corresponding to equal positive and negative amplitudes in a PCM code, and the amplitude samples are represented by digital PCM code words, the improvement comprising the step of generating a transmission control signal in response to the signal generated in step (c) above and having a variable duration equal to the duration of a detected speech burst but not exceeding a predetermined maximum.

2. In an apparatus for detecting a speech signal in the presence of noise, including:

(a) means for establishing a detection threshold at a level where the probability of the instantaneous value of a speech signal exceeding its RMS value is greater than the probability of the instantaneous value of a noise signal exceeding its RMS value, (b) means for comparing instantaneous amplitude samples of a speech signal with the threshold level, and (c) means for generating a signal to indicate the presence of speech whenever an amplitude sample exceeds the threshold level, and wherein the threshold level is represented by a digital code word corresponding to equal positive and negative amplitudes in a PCM code, and the amplitude samples are represented by digital PCM code words, the improvement comprising means for generating a transmission control signal in response to the signal generated by the means recited in subparagraph (c) above and having a variable duration equal to the duration of a detected speech burst but not exceeding a predetermined maximum.

3. An apparatus as defined in claim 2 wherein the means for generating comprises:

(a) means for measuring and accumulating the duration of a speech burst, (b) means for terminating the measuring means when the duration reaches a predetermined maximum, (c) means for measuring and accumulating a comparison time period commencing with the cessation of the speech burst, and (d) means for producing an output when both accumulating means contain the same value.

References Cited

UNITED STATES PATENTS

| | | | |
|---|---|---|---|
| 3,508,007 | 4/1970 | Goodall | 179—15 AS |
| 3,424,869 | 1/1969 | Anderson | 179—15 AS |
| 3,520,999 | 7/1970 | May | 179—15 AS |
| 3,369,080 | 2/1968 | Miller | 179—18 BC |

KATHLEEN H. CLAFFY, Primary Examiner

J. B. LEAHEEY, Assistant Examiner

U.S. Cl. X.R.

179—15 AS